Patented June 18, 1929.

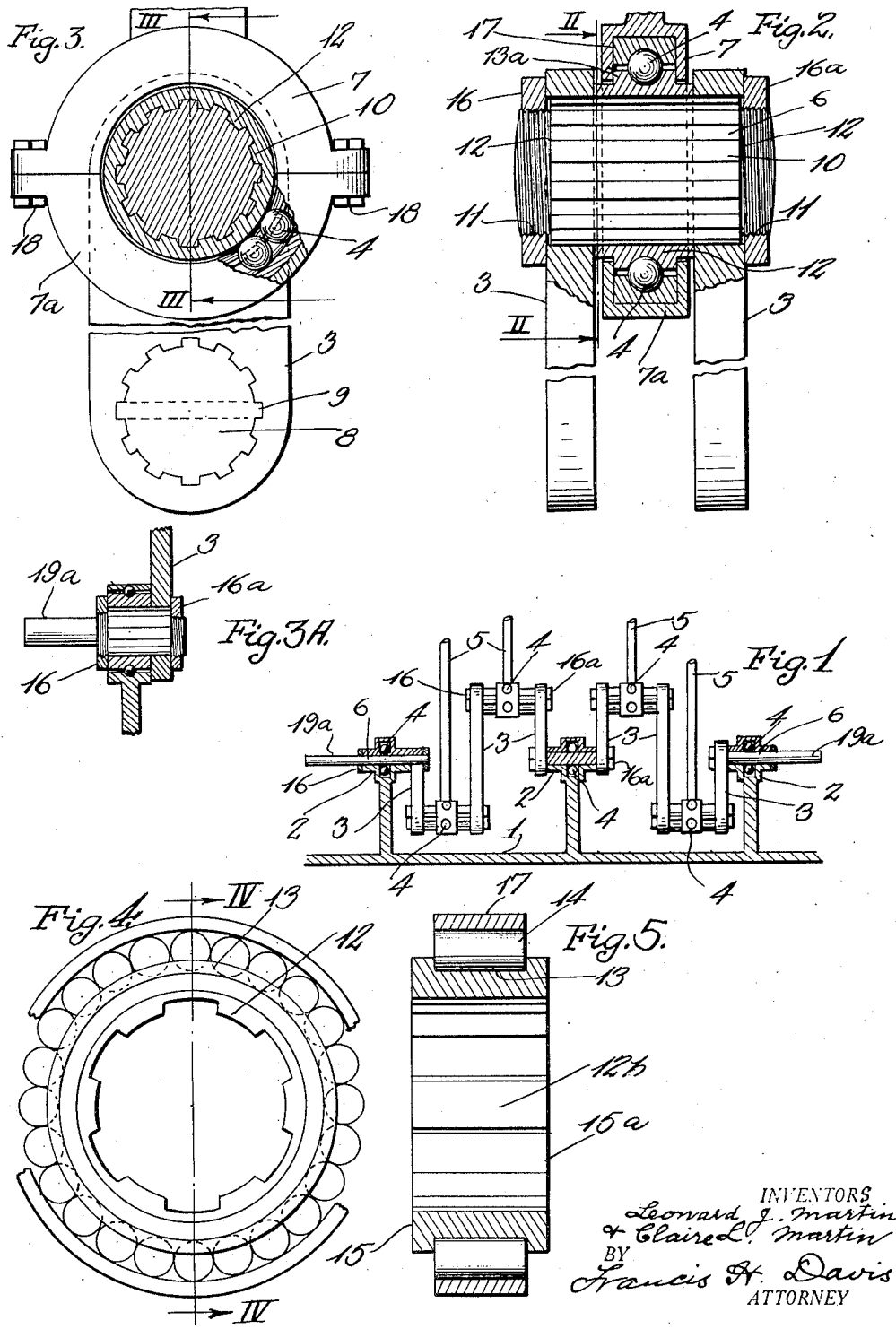

1,717,572

UNITED STATES PATENT OFFICE.

LEONARD J. MARTIN AND CLAIRE L. MARTIN, OF GREENFIELD, CALIFORNIA.

COMPOSITE CRANK SHAFT.

Application filed August 2, 1928. Serial No. 297,078.

Our invention relates broadly to crank-shafts for power plants, but more particularly to a built up crank-shaft that is highly adaptable for use in such mechanism as automotive vehicles, air-craft, speed-boats and the like.

The chief object of our invention is to provide a composite crank-shaft built of sectional arms, pins, bearings and associated parts, so constructed that all working parts are provided with anti-fricton elements, said elements being removable individually without disturbance to the associated parts.

Further objects will appear as the specification unfolds.

We, the inventors, handle garage service, and the present invention is the outcome of our almost daily experience of replacing "burnt-out" auto crank-shaft bearings, mostly all emergency cases where the people requiring the service are forced to wait for considerable time while the machinery is being taken apart and reassembled to effect the repairs; whereas, by the use of our invention there are no bearings to burn out. True, there are ball or roller-bearings, but according to our improved and novel construction these can be taken out and new "stock-parts" substituted in a few moments without having to take apart any of the machinery except the part immediately involved.

We attain these objects by the mechanism illustrated in the accompanying drawings, in which:—

Figure 1 is a reduced elevational general view of our crank-shaft with portions cut away.

Fig. 2 is an elevational view of two crank-arms cut away at the upper portion thereof along the line III—III of Fig. 3.

Fig. 3 is a side elevation of Fig. 2 with one crank-arm removed along the line II—II of Fig. 2.

Fig. 3^A is a sectional view of an end element.

Fig. 4 is an end view of an anti-frictional element.

Fig. 5 is a section of Fig. 4 taken on the line IV—IV.

Similar reference characters refer to similar parts throughout the several views.

In the drawing the numeral 1 designates a supporting frame, 2, 2, 2, the main bearings, 3, the crank-arms, 4 the antifrictional elements.

By reference to Fig. 1 it will be seen that the various arms 3 are arranged to operate the connecting rods 5, 5, 5, and 5 that are connected to the arms 3 by the pin members 6, the antifrictional elements 4 being interposed between said pins 6 and the various straps 7—7ª as is well shown in Fig. 2.

The arms 3 are of suitable lengths to make up in desired pairs and are provided at each end thereof with the perforations 8, the walls of said perforations being furnished with the splines or key-seats 9, the vertical walls thereof being preferably disposed parallel to each other as indicated by the dotted lines in Fig. 3, the same being for convenience of manufacture.

Now, by reference to Fig. 2 it is seen that the pin 6 serves to bind the crank-arms 3 together, and also as the carrying member for the antifrictional elements 4 which transmit energy to the connecting rods 5.

The pin 6 has the longitudinal, regularly spaced grooves 10 formed on its outer surface so as to leave the longitudinal ribs 9ª between said grooves, said grooves and ribs being counter-parts and complements of the splines or key-seats 9 formed in the perforations 8 said parts being adapted to coincide with each other as a perfect fit, so that by gentle tapping blows the said pin may be driven into any pair of said crank-arms so as to form a very rigid connecting member therefor.

At a suitable distance from each end thereof said pin 6 is turned down in diameter to the bottom of said grooves so as to leave a reduced cylindrical portion from the points 12 outwardly which are screw-threaded at II—II to engage the nuts 16 and 16ª.

Another very important feature of our invention is the inner member 12^b of the antifrictional elements 4.

As is well shown in Figs. 4 and 5 said member is provided on its outer circumference with the race means 13 which is adapted to co-act with the rollers 14, and the outer member 17 or it may be formed as shown in Fig. 2 at 13ª as being adapted to accommodate a plurality of balls as 4.

However in general appearance said member 12^b is a cylindrically-shaped ring whose ends 15 and 15ª are square with the axis of perforation and parallel with each other.

Said member 12^b is splined or key-seated internally in every way co-incidentally so as to be a circumferential fit for the pin 6, just as are the perforations 8 of the arms 3.

The object of this construction of the arms 3, the member 12ᵇ and the pin 6 is that when said arms and the member 12ᵇ are assembled as shown in Fig. 2 said pin 6 may be driven completely through both said arms 3 and the member 12ᵇ right or left from either direction. It should be noted that when the nuts 16 and 16ᵃ (Figs. 1 and 2) are driven up tight the inner surfaces of the crank-arms 3—3 are drawn with great force against the end surfaces 15—15ᵃ of the member 12ᵇ, which said surfaces are free to do as the shoulders 12—12 of the pin 6 do not extend far enough to interfere, being purposely cut a trifle short.

The outer members 17 of the anti-frictional elements 4 are closely fitted in the strap members 7 and 7ᵃ respectively, which are secured in place by bolt means 18—18.

The pins 19 of the outer main bearings are substantially identical with the pins 6 except that they may be provided at one end thereof with the extensions 19ᵃ—19ᵃ that are turned off smooth with the bottom of the screw-threads 11 as shown in Fig. 1.

In order to explain the working of the present invention and the advantages thereof it is necessary to point out the novelties of construction involved and the interrelation of parts and method of assembling the same.

The crank-arms 3 may be provided with any desirable number of splines or key-seats 9, Figures 2 and 3 show twelve, twelve being a convenient number to factor so that the various crank elements may be set at various angles, whereas, Figs. 4 and 5 show six splines.

Whatever the number of said splines may be the same number must naturally obtain in the corresponding pin 6 and in the member 12ᵇ.

When assembling, the first thing is to insert one end of any pin 6 in the perforation 8 and by tapping it lightly drive said pin through said arm far enough to admit of the member 12ᵇ complete with the remainder of the anti-frictional elements such as the rollers 14 and the outer member 17 being also tapped lightly on the protruding portion of said crank 3. Next, the companion crank-arm is tapped on to said pin 6, being careful to see that said arms lie in the same plane. Now, by screwing on the nuts 16 and drawing up evenly on each end of said pin the inner surfaces of said arms (as previously explained) are jammed tight against the respective end surfaces 15 and 15ᵃ of the member 12ᵇ whereby a most rigid construction is attained.

Obviously the remainder of said crank may be built up in a similar manner by engagement of the pairs of said cranks with the corresponding pins 6 to secure the relative degree with respect to the circle according to the number of cranks required.

When in operation there is practically no wear upon the cranks 3 and none whatever upon the crank-pins 6, all the wear may be said to fall upon the anti-frictional elements 4, which in every case may be instantly removed by the removal of one nut as 16 or 16ᵃ from the pin 6 which allows said pin to be moved axially which admits of a new stock part being substituted.

It is believed that the construction, operation and advantages of the invention will now be clearly understood. The present embodiments of the invention have been disclosed in detail merely by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described our invention, what we claim as new is:—

1. A crank-shaft comprising a pair of crank-shaft end members, each provided with a body portion having a series of longitudinally disposed grooves and ribs for the entire length thereof, a series of crank-pins each provided with a body portion having a series of longitudinally disposed grooves and ribs for the entire length thereof, a series of crank-arms, each arm having a pair of transverse perforations parallel to each other, each of the perforations having a series of grooves and ribs counterparts of the grooves and ribs on the body portions of said end members and said crank-pins, an anti-frictional element whose inner member is provided with grooves and ribs also counterparts of the grooves and ribs on the body portions of said end members and said crank-pins and means to bind said members, pins and parts securely together.

2. In a crank-shaft as set forth in claim 1, an end member suitably reduced and threaded for counterpart nut means, so spaced apart that when screwed home the inner surfaces of said crank-arms will abut the end surfaces of said anti-frictional element.

3. In a crank-shaft as set forth in claim 1, the combination therewith, of either ball or roller bearings, and connective means therefrom, said means constituting a means of power reception from a source of energy.

In testimony that we claim the foregoing as our own, we have hereunto affixed our signatures this 23rd day of July, 1928.

LEONARD J. MARTIN.
CLAIRE L. MARTIN.